United States Patent
Schnaare et al.

(10) Patent No.: US 7,287,432 B2
(45) Date of Patent: Oct. 30, 2007

(54) PROCESS TRANSMITTER WITH OVERPRESSURE VENT

(75) Inventors: Theodore Henry Schnaare, Carver, MN (US); Chad Michael McGuire, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/281,069

(22) Filed: Nov. 17, 2005

(65) Prior Publication Data

US 2007/0107525 A1 May 17, 2007

(51) Int. Cl.
*G01L 7/00* (2006.01)
(52) U.S. Cl. .......................................... 73/706; 73/756
(58) Field of Classification Search ................. 73/716, 73/706, 756
See application file for complete search history.

(56) References Cited

U.S. PATENT DOCUMENTS

| | | | |
|---|---|---|---|
| 2,188,268 A | 5/1938 | Schellenger | 201/48 |
| 2,958,750 A | 11/1960 | Lebens | 200/133 |
| 3,542,988 A | 11/1970 | Baldasare | 200/168 |
| 3,701,284 A | 10/1972 | De Meyer | 73/416 |
| 3,841,158 A * | 10/1974 | Hunter | 73/721 |
| 3,909,726 A | 9/1975 | Dobrovolny et al. | 325/357 |
| 4,028,945 A * | 6/1977 | Bergamini | 73/706 |
| 4,313,025 A | 1/1982 | Grube, Jr. | 174/50 |
| 4,384,165 A | 5/1983 | Loving, Jr. et al. | 174/35 |
| 4,424,404 A | 1/1984 | Moore et al. | 17/52 |
| 4,430,520 A | 2/1984 | Tibbetts et al. | 174/35 |
| 4,567,317 A | 1/1986 | Ehrlich et al. | 174/35 |
| 4,596,670 A | 6/1986 | Liu | 252/511 |
| 4,749,821 A | 6/1988 | Linton et al. | 174/35 |
| 4,814,566 A | 3/1989 | Sigl | 200/305 |
| 4,870,863 A | 10/1989 | Duncan et al. | 73/431 |
| 4,878,012 A | 10/1989 | Schulte et al. | 324/60 |
| 4,910,090 A | 3/1990 | Kuhlman et al. | 428/469 |
| 4,936,690 A | 6/1990 | Goetzinger | 374/181 |
| 4,949,581 A * | 8/1990 | Rud, Jr. | 73/706 |
| 4,958,938 A | 9/1990 | Schwartz et al. | 374/208 |
| 5,001,298 A | 3/1991 | Jong | 174/35 |

(Continued)

FOREIGN PATENT DOCUMENTS

DE   20 2004 000 564 U1   5/2004

(Continued)

OTHER PUBLICATIONS

Kelly M. Orth et al., entitled "Process Transmitter Incorporating Circuit Card Assembly as Environment and EMI/RFI Shield", filed Sep. 16, 2004, U.S. Appl. No. 10/942,340, 37 pages.

(Continued)

*Primary Examiner*—Andre J. Allen
(74) *Attorney, Agent, or Firm*—Westman, Champlin & Kelly, P.A.

(57) ABSTRACT

An overpressure vent in a transmitter housing of a process transmitter. The transmitter is configured for coupling to an industrial process and measuring a process variable. The transmitter includes an enclosure having a cavity formed therein. A process coupling is configured to couple the cavity to the industrial process. The overpressure vent is arranged to vent an overpressure in the cavity to outside of the transmitter enclosure.

24 Claims, 2 Drawing Sheets

U.S. PATENT DOCUMENTS

| | | | |
|---|---|---|---|
| D317,266 S | 6/1991 | Broden et al. | D10/46 |
| 5,022,270 A * | 6/1991 | Rud, Jr. | 73/706 |
| D318,432 S | 7/1991 | Broden et al. | D10/46 |
| 5,033,032 A | 7/1991 | Houghtaling | 367/160 |
| 5,070,216 A | 12/1991 | Thornton | 174/35 |
| 5,128,835 A | 7/1992 | Rudy, Jr. et al. | 361/424 |
| 5,131,275 A | 7/1992 | Huang | 73/756 |
| 5,331,059 A | 7/1994 | Engelhardt et al. | 525/340 |
| 5,353,200 A | 10/1994 | Bodin et al. | 361/816 |
| 5,371,404 A | 12/1994 | Juskey et al. | 257/659 |
| 5,546,804 A | 8/1996 | Johnson et al. | 73/431 |
| 5,731,522 A * | 3/1998 | Sittler | 73/708 |
| 5,977,626 A | 11/1999 | Wang et al. | 257/707 |
| 6,089,097 A | 7/2000 | Frick et al. | 73/718 |
| 6,122,178 A | 9/2000 | Andrews et al. | 361/800 |
| 6,255,140 B1 | 7/2001 | Wang | 438/122 |
| 6,510,740 B1 | 1/2003 | Behm et al. | 73/708 |
| 6,511,337 B1 | 1/2003 | Fandrey et al. | 439/320 |
| 6,593,857 B1 | 7/2003 | Roper et al. | 340/870.3 |
| 6,609,427 B1 | 8/2003 | Schnaare et al. | 73/753 |
| 6,615,665 B1 | 9/2003 | Flögel et al. | 73/715 |
| 6,662,662 B1 * | 12/2003 | Nord et al. | 73/715 |
| 6,678,170 B2 | 1/2004 | Barringer et al. | 361/800 |
| 6,717,485 B2 | 4/2004 | Kolb et al. | 333/12 |
| 6,740,959 B2 | 5/2004 | Alcoe et al. | 257/659 |
| 6,744,640 B2 | 6/2004 | Reis et al. | 361/818 |
| 6,747,350 B1 | 6/2004 | Lin et al. | 257/704 |
| 6,796,185 B2 * | 9/2004 | Kurosawa et al. | 73/716 |
| 2003/0042925 A1 | 3/2003 | Kirk | 324/320 |
| 2004/0040384 A1 * | 3/2004 | Kurosawa et al. | 73/716 |
| 2006/0055066 A1 | 3/2006 | Orth et al. | |

FOREIGN PATENT DOCUMENTS

| | | |
|---|---|---|
| GB | 2 169 925 A | 7/1986 |
| JP | 2000-077575 | 3/2000 |

OTHER PUBLICATIONS

"Notification of Transmittal of International Search Report and Written Opinion" for PCT/US2005/033129.

Advertisement by Rosemount Inc. "Asking the Right Questions Leads to Smart Decisions", Jul. 1991.

Article, "Model 1151 Smart Pressure Transmitter keeps getting better", published in Oct. 1991, from Instrumentation & Control Systems, vol. 64, p. 145.

Rosemount, "Model 1151 Smart Pressure Transmitters," Dec. 1991.

Rosemount Inc., "Model 1151 Smart Pressure Transmitters," Oct. 1990.

Rosemount Inc., "Maximum Flexibility At Minimum Cost," 1983 (date without month provided).

Manual 4592, "Model 2024 Differential Pressure Transmitter," Instruction Manual Jun. 1990.

Rosemount Inc. "Model 3044 Temperature Transmitter," Manual 4562, Aug. 1988.

Rosemount Inc., "Model 3051C Smart Pressure Transmitter," Manual 4622/4623, Jan. 1991.

Color photographs of prior art transmitters (18 sheets).

Notification of Transmittal of the International Search Report and the Written Opinion of the international Searching Authority for PCT/US2006/043368.

* cited by examiner

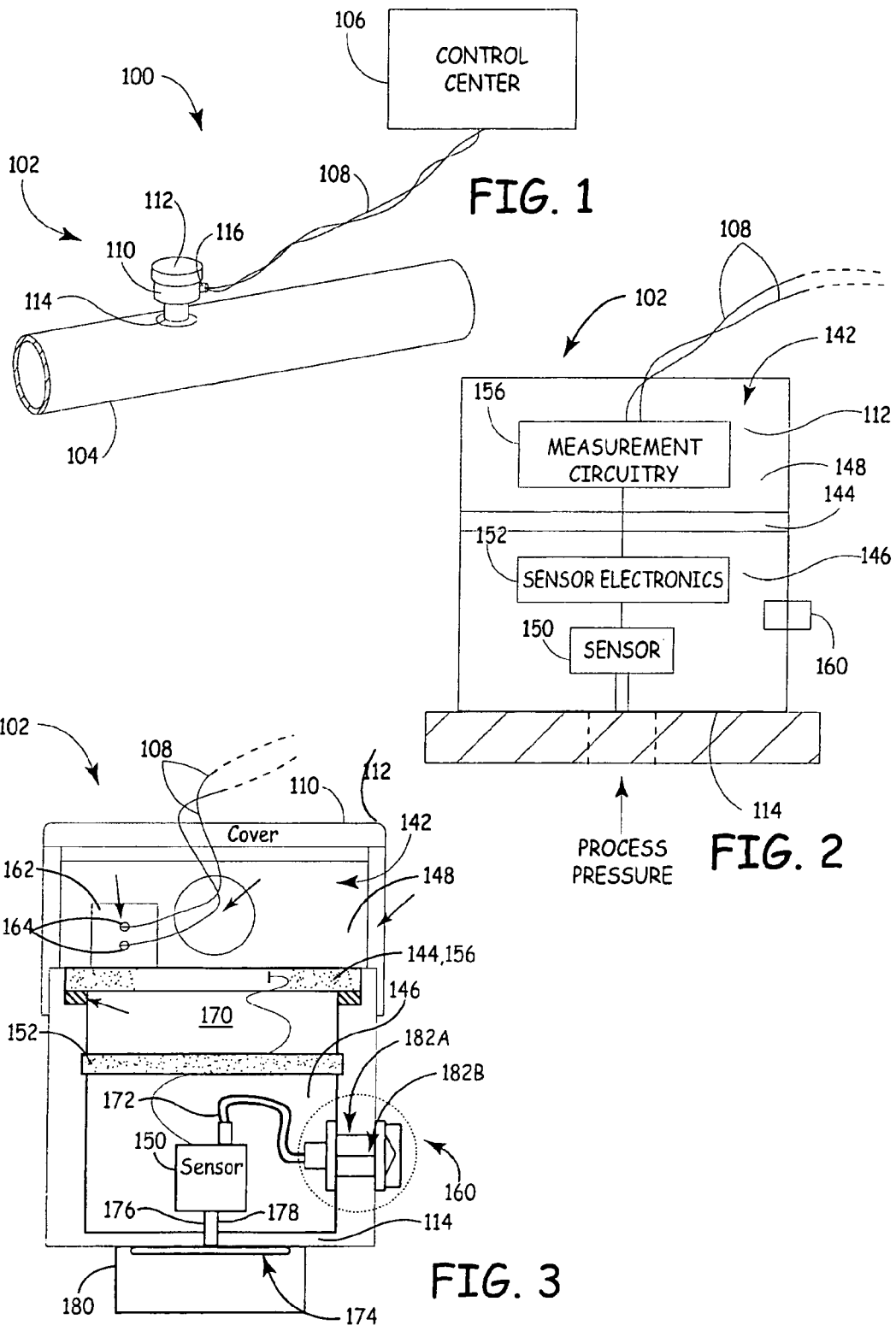

PROCESS TRANSMITTER WITH OVERPRESSURE VENT

BACKGROUND OF THE INVENTION

The present invention relates to field devices for use in industrial processes. More specifically, the present invention relates to transmitters used to transmit process variables to monitor or control such an industrial process.

Generally, electronic field devices (such as process transmitters) are used to monitor the operation of industrial processes such as those in oil refineries, chemical processing plants, paper processing plants, biotechnology plants, pharmaceutical plants, food and beverage plants, and the like. Process transmitters for monitoring an industrial process may measure pressure, flow rate, fluid or material level in a tank, temperature, vibration, and the like. Additionally, such field devices may include analytical electronics, diagnostic electronics, or other process monitoring electronic devices, or even electronic, hydraulic or pneumatic actuator devices used for industrial process control.

Process transmitters are typically positioned within the processing plant in locations where liquids, dust and humidity and various industrial contaminants may be present. In some environments, process liquids such as acid solutions or base solutions can be present. Liquids may also include spray from hoses used to clean plant equipment. Liquids can drip, splash or spray onto the process transmitter and its electrical connections. Additionally, dust, humidity, and liquids in the environment may contaminate and degrade the electrical connections to and within the process transmitter.

In order to protect circuitry within the transmitter, the transmitter housing typically provides a seal against the local environment. This seal can be configured to meet explosive protection standards in order to reduce the likelihood of ignition of combustible materials. One transmitter configuration which illustrates an internal barrier is shown and described in U.S. Pat. No. 6,089,097, issued Jul. 18, 2000 to Frick et al.

SUMMARY

The present invention provides an overpressure vent in a sealed transmitter housing of a process transmitter. In one configuration, a transmitter is provided for coupling to an industrial process and measuring a process variable. The transmitter includes an enclosure having a cavity formed therein. A process coupling is configured to couple the cavity to the industrial process. An overpressure vent is arranged to vent an overpressure in the cavity to outside of the transmitter enclosure.

BRIEF DESCRIPTION OF THE DRAWINGS

FIG. 1 is a simplified block diagram of a field device according to an embodiment of the present invention.

FIG. 2 is a simplified cross sectional view of the transmitter of FIG. 1.

FIG. 3 is a more detailed cross section view of the transmitter of FIG. 1.

DETAILED DESCRIPTION

Figure 4A:
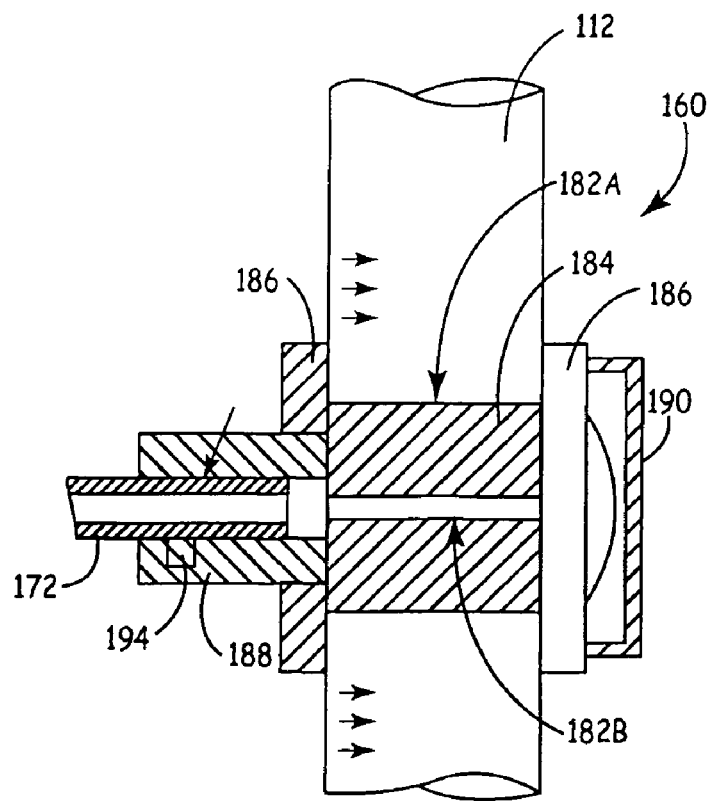
FIG. 4A is a side cross sectional view of the overpressure vent in accordance with one embodiment of the invention during normal operation.

As discussed in the background section, process transmitters are used in industrial processes for coupling to the process and measuring a process variable. Example process variables include pressure, temperature, flow rate, etc. Process transmitters typically include a sealed transmitter housing or enclosure which carries a sensor and circuitry of the process transmitter. In one configuration of a process transmitter, a bulkhead is used to divide a cavity of the transmitter enclosure into a first cavity and a second cavity. Such a configuration is described in co-pending application Ser. No. 10/942,340 entitled "Field Assembly Incorporating Circuit Card Assembly as Environmental and EMI/RFI Shield" by Kelly M. Orth and Chad M. McGuire, filed Sep. 16, 2004 and commonly assigned with the present application which is incorporated here in by reference in its entirety. In such a configuration, the bulkhead can be configured to provide a seal between the first and second cavities. However, if a component in the transmitter fails and allows process pressure to be applied directly to one of the cavities, it may be possible for the process pressure to cross the bulkhead seal and enter the second cavity. Such an occurrence may be undesirable, for example, if the second cavity contains additional circuits. The present invention provides an overpressure vent in the first cavity which is arranged to vent an overpressure in the first cavity to outside of the transmitter enclosure. This reduces the pressure applied to the bulkhead seal and thereby reduces the likelihood that the process pressure is able to breach the bulkhead seal and enter into the second cavity.

FIG. 1 illustrates a simplified diagram of a process transmitter system 100 according to an embodiment of the present invention. Process transmitter 102 is coupled to process pipe segment 104 in order to measure a parameter or process variable associated with a fluid contained within the process pipe segment 104. The transmitter 102 is coupled to control center 106 via a field wiring 108. In general, field wiring includes both power/ground cabling and a communications link. The field wiring 108 may include two or more wires. In an alternative embodiment, the field wiring 108 provides power and ground connections, but communication between the transmitter 102 and the control center 106 occurs via wireless communications link (not shown). In one specific configuration, field wiring 108 comprises a two wire process control loop of the type which is known in the art. Example process control loops include those which communicate using a 4-20 mA signal, or communicate using digital protocols including, for example, HART® communication protocol, a Field Bus protocol, etc. In such a configuration, circuitry within the transmitter can be completely powered with power received over the two wire process control loop.

In general, transmitter 102 includes a housing 110 with a cover 112. The housing 110 is coupled to the pipe segment 104 via a sealed base or process coupling 114, which may couple to a coupling flange or other attachment mechanism provided by a customer for a specific installation. A wiring conduit 116 is provided on the housing body 110 to provide an access opening for the field wiring 108 to enter the housing 110 for connecting electronics within the transmitter housing 110 to the control center 106.

FIG. 2 is a side cross sectional view of process transmitter 102 showing an example simplified embodiment of the present invention. Transmitter 102 includes generally a transmitter housing 112 forming a cavity 142 therein. A bulkhead 144 is positioned in the cavity 142 and divides the cavity 142 into a first cavity 146 and a second cavity 148. Bulkhead 144 provides a seal between cavities 146 and 148.

In the configuration shown in FIG. 2, the first cavity 146 is configured to couple to an industrial process to receive a process pressure at process coupling 114. A process variable sensor 150 and sensor electronics 152 are positioned within first cavity 146. Sensor 150 can be, for example, a pressure sensor configured to receive the process pressure and provide an electrical output to sensor electronics 152 related to the sensor pressure. Measurement circuitry 156 is positioned within a second cavity 148 and is configured to provide an output on process control loop 108 related to the sensed pressure. In one configuration, bulkhead 144 comprises an electric circuit board configured to carry measurement circuitry 156. Example configurations of bulkhead 144 are discussed in co-pending application Ser. No. 10/942,340 entitled "Field Assembly Incorporating Circuit Card Assembly as Environmental and EMI/RFI Shield" by Kelly M. Orth and Chad M. McGuire, filed Sep. 16, 2004.

In accordance with the present invention, an overpressure vent 160 is arranged in the first cavity 146 and transmitter housing 112 to extend between cavity 146 and outside of housing 112. Overpressure vent 160 is configured to couple cavity 146 with the environment outside of transmitter housing 112 if a difference between the pressure within cavity 146 and the ambient pressure exceeds a predetermined threshold. For example, the predetermined threshold can be selected to be less than a pressure in cavity 146 which could cause the seal provided by barrier 144 to fail.

FIG. 3 is a side cross sectional view of process transmitter 102 in somewhat greater detail than that of FIG. 2. In the configuration of FIG. 3, the bulkhead 144 is illustrated as also carrying measurement circuitry 156. A terminal block 162 couples to the measurement circuitry 156 and carries terminals 164 thereon. Terminals 164 are used to couple the measurement circuitry 156 to a process control loop 108.

A seal 170 is illustrated in FIG. 3 which is configured to seal the bulkhead 144 between cavities 146 and 148. The sealing technique can be any appropriate technique or method to seal the bulkhead or to provide a seal with the bulkhead between cavities 146 and 148.

In FIG. 3, a vent tube 172 is illustrated as coupling sensor 150 to overpressure vent 160. In this configuration, overpressure vent 160 provides two functions: normal venting of sensor 150 as well as overpressure venting of cavity 146. Pressure sensor 150 is coupled to process fluid through a primary seal 174. The primary seal can comprise, for example, an isolation diaphragm with process fluid on one side and isolation fluid 176 carried in capillary tubing 178 on the other side. As a pressure is applied to the diaphragm, the pressure is transferred to the isolation fluid 176 and to the pressure sensor 150. A process interface 180 such as a manifold or the like is used to couple process coupling 114 to industrial process. For example, the manifold can be used to couple the transmitter 102 to process piping.

Figure 4B:
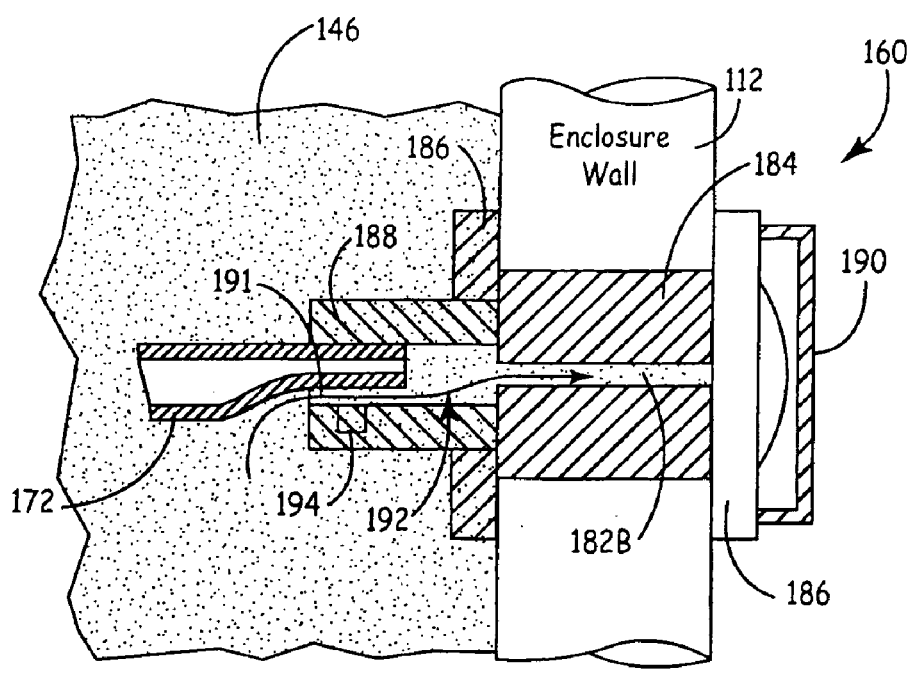
FIG. 4B is a side cross sectional view of the overpressure vent of FIG. 4A during the occurrence of an overpressure condition.

In the configuration of FIG. 3, overpressure vent 160 introduces two flame paths 182A and 182B into cavity 146. One of the flame paths 182B is provided through the vent itself while the other flame path 182A is introduced where the vent 160 couples to the housing 112. The flame paths 182A and 182B must be configured to meet any flameproof requirements for a particular installation. FIGS. 4A and 4B are side cross sectional views of the overpressure vent 160. In FIG. 4A, valve 160 is shown during normal operation while in FIG. 4B valve 160 is shown while venting an overpressure. Overpressure vent 160 comprises a center insert 184 which extends through housing 112 which is secured by cowling 186. A sealing coupling 188 couples vent tube 172 to the overpressure vent 160. Flame path 182B comprises an opening through an insert 184 which can be sealed to coupling 188 using an appropriate technique such as sintering. Flame path 182A between insert 184 and housing 112 can also be sealed using any appropriate technique. For example, insert 184 can be screwed into a threaded opening in housing 112. A vent cover 190 is configured to prevent opening 182B from being clogged or otherwise blocked and to reduce the effects of direct impingement of a water jet during cleaning processes.

In FIG. 4A, vent tube 172 is configured to vent the sensor 150 shown in FIG. 3 to the environment through opening 182B. However, upon the occurrence of an overpressure condition within enclosure 146, an opening 191 is formed between vent tube 172 and coupling 188 as illustrated in FIG. 4B. This allows a venting path 192 to be formed from first cavity 146 to the environment through opening 182B. The overpressure at which venting path 192 is formed can be controlled by controlling the strength of the seal between the vent tube 172 and coupling 188.

In one configuration, the overpressure vent 160 can vent overpressure occurrences that occur more than once. However, in another configuration, once an overpressure occurs and the overpressure is vented, the overpressure vent 160 remains open between the first cavity 146 and the environment. In another example, a sensor 194 is provided which couples to, for example, measurement circuitry 156 and provides an output signal which is indicative of the status or condition of overpressure vent 160. For example, a signal can be provided to indicate that the overpressure vent 160 is open between the first cavity 146 and the environment, or that the vent has been previously opened. This information can be transmitted over the process control loop 108 to inform an operator that maintenance is required. This also can provide a warning to indicate that process fluid is being vented to the environment. The overpressure vent 160 can be formed of any appropriate materials. For example, the vent tube 172 can be formed of nonmetallic tubing configured to bend or otherwise be compressed upon the occurrence of overpressure.

Although the present invention has been described with reference to preferred embodiments, workers skilled in the art will recognize that changes may be made in form and detail without departing from the spirit and scope of the invention. Although the specific configurations shown herein include a bulkhead which divides the transmitter housing into first and second cavities, in one configuration there is no bulkhead and the type of transmitter comprises only a single cavity. The overpressure vent can comprise any vent configuration as not limited to the specific configuration described above. Another example configuration is, for example, a ball and spring check valve. Preferably, the overpressure vent is configured to meet any flame proof or explosion proof requirements for particular installation.

What is claimed is:

1. A transmitter for coupling to an industrial process and measuring a process variable, comprising:
a transmitter enclosure having a cavity formed therein which carries measurement circuitry configured to measure the process variable;
a process coupling configured to couple the cavity to the industrial process; and
an overpressure vent arranged to vent an overpressure in the first cavity to outside of the transmitter enclosure.

2. The apparatus of claim 1 including a bulkhead in the cavity positioned to divide the cavity into a first cavity and a second cavity and form a seal there between.

3. The apparatus of claim 2 wherein the measurement circuitry is carried in the second cavity.

4. The apparatus of claim 2 wherein the bulkhead carries the measurement circuitry.

5. The apparatus of claim 2 including a pressure sensor in the first cavity.

6. The apparatus of claim 1 wherein the measurement circuitry is configured to couple to a two wire process control loop.

7. The apparatus of claim 6 wherein circuitry of the transmitter is completely powered with power received over the two wire process control loop.

8. The apparatus of claim 1 including a pressure sensor and a vent connection to the overpressure vent.

9. The apparatus of claim 1 wherein the overpressure vent extends through the transmitter enclosure and including a flame proof seal there-between.

10. The apparatus of claim 1 wherein the overpressure vent comprises a deformable member configured to deform in response to an overpressure in the cavity and provide a vent path between the cavity and outside of the transmitter enclosure.

11. The apparatus of claim 1 wherein the overpressure vent includes a sensor configured to sense a condition of the overpressure vent.

12. The apparatus of claim 11 wherein the measurement circuitry is coupled to the overpressure sensor and configured to provide an output in response to a sensed overpressure condition.

13. The apparatus of claim 2 wherein the overpressure vent is arranged to vent an over pressure in the first cavity.

14. A method for controlling overpressure in an industrial process measurement transmitter of the type configured to measure a process variable, comprising:
   providing a transmitter enclosure having a cavity formed therein which carries measurement circuitry configured to measure the process variable;
   coupling the cavity to the industrial process;
   venting an overpressure in the cavity to outside of the transmitter enclosure.

15. The method of claim 14 including sealing the cavity to form a first cavity and a second cavity.

16. The method of claim 15 wherein the measurement circuitry is carried in the second cavity.

17. The method of claim 15 wherein the bulkhead carries the measurement circuitry.

18. The method of claim 15 including providing a pressure sensor in the first cavity.

19. The method of claim 14 including coupling the measurement circuitry to a two-wire process control loop.

20. The method of claim 19 including powering circuitry of the transmitter with power received over the two wire process control loop.

21. The method of claim 14 including providing a pressure sensor and a vent connection to the overpressure vent.

22. The method of claim 14 venting an overpressure comprises deforming a deformable member in response to an overpressure in the cavity and providing a vent path between the cavity and outside of the transmitter enclosure.

23. The method of claim 14 including sensing a condition of the overpressure vent.

24. The method of claim 23 including providing an output in response to a sensed overpressure condition.

* * * * *

UNITED STATES PATENT AND TRADEMARK OFFICE
CERTIFICATE OF CORRECTION

PATENT NO.         : 7,287,432 B2  
APPLICATION NO. : 11/281069  
DATED               : October 30, 2007  
INVENTOR(S)       : Theodore H. Schnaare Page 1 of 1

It is certified that error appears in the above-identified patent and that said Letters Patent is hereby corrected as shown below:

Title Page under (56) References Cited - please insert the following:

| | | | |
|---|---|---|---|
| 6,297,551 A | 10/2001 | Dudderar et al. | 257/723 |
| 6,377,464 A | 4/2002 | Hasemi et al. | 361/760 |
| 6,903,910 A | 6/2005 | Griesing et al. | 361/38 |

Signed and Sealed this

Twenty-ninth Day of April, 2008

JON W. DUDAS  
*Director of the United States Patent and Trademark Office*